United States Patent
Debecker et al.

(10) Patent No.: US 10,076,806 B2
(45) Date of Patent: Sep. 18, 2018

(54) LASER NOZZLE COMPRISING AN ELEMENT MOVABLE IN A GAS LAYER

(71) Applicant: L'Air Liquide, Societe Anonyme Pour l'Etude et l'Exploitation des Procedes Georges Claude, Paris (FR)

(72) Inventors: Isabelle Debecker, Paris (FR); Thomas Jouanneau, Grenoble (FR); Philippe Lefebvre, Meulan (FR)

(73) Assignee: L'Air Liquide, Société Anonyme pour l'Etude et l'Exploitation des Procédés Georges Claude, Paris (FR)

( * ) Notice: Subject to any disclaimer, the term of this patent is extended or adjusted under 35 U.S.C. 154(b) by 1170 days.

(21) Appl. No.: 14/356,706

(22) PCT Filed: Oct. 22, 2012

(86) PCT No.: PCT/FR2012/052411
§ 371 (c)(1),
(2) Date: May 7, 2014

(87) PCT Pub. No.: WO2013/068665
PCT Pub. Date: May 16, 2013

(65) Prior Publication Data
US 2015/0048069 A1     Feb. 19, 2015

(30) Foreign Application Priority Data

Nov. 7, 2011    (FR) ...................... 11 60051

(51) Int. Cl.
*B23K 26/06*     (2014.01)
*B23K 26/14*     (2014.01)
(Continued)

(52) U.S. Cl.
CPC ...... *B23K 26/1476* (2013.01); *B23K 26/0648* (2013.01); *B23K 26/142* (2015.10); *B23K 26/1462* (2015.10); *B23K 26/38* (2013.01)

(58) Field of Classification Search
CPC .............. B23K 26/0648; B23K 26/142; B23K 26/1462; B23K 26/1476; B23K 26/38; B23K 26/00; B23K 26/14; B23K 26/16
(Continued)

(56) References Cited

FOREIGN PATENT DOCUMENTS

| | | |
|---|---|---|
| EP | 1669159 | 6/2006 |
| JP | 61037393 | 2/1986 |

(Continued)

OTHER PUBLICATIONS

German to English machine translation of EP 1669159.*
FR 1160051 Search Report, dated Jun. 28, 2012 (2 pp).
PCT/FR2012/052411 Search Report, dated Mar. 11, 2013 (2 pp).

*Primary Examiner* — Michael G Hoang
(74) *Attorney, Agent, or Firm* — Elwood L. Haynes

(57) ABSTRACT

Laser nozzle usable for laser cutting, especially with a fiber or disk laser, comprising: a nozzle body comprising an axial housing passing axially through the nozzle body and comprising a first output orifice located in the front side of the nozzle body; a movable element able to move in translation in the axial housing in the direction of the first output orifice under the effect of a gas pressure acting on the movable element; and an elastic element arranged in the axial housing, between the nozzle body and the movable element, the elastic element exercising an elastic return force on the movable element tending to oppose the translation movement in the axial housing in the direction of the first output orifice.

8 Claims, 3 Drawing Sheets

(51) Int. Cl.
*B23K 26/16* (2006.01)
*B23K 26/00* (2014.01)
*B23K 26/38* (2014.01)
*B23K 26/142* (2014.01)

(58) Field of Classification Search
USPC ............ 219/50, 121.6, 121.67, 121.72, 162, 219/121.75, 121.7, 121.84
See application file for complete search history.

(56) References Cited

FOREIGN PATENT DOCUMENTS

| | | |
|---|---|---|
| JP | 62006790 | 1/1987 |
| JP | 7251287 | 10/1995 |
| WO | WO 0230612 | 4/2002 |

* cited by examiner

LASER NOZZLE COMPRISING AN ELEMENT MOVABLE IN A GAS LAYER

CROSS-REFERENCE TO RELATED APPLICATIONS

This application is a 371 of International Application PCT/FR2012052411, filed Oct. 22, 2012, which claims priority to French Application No. 1160051, filed Nov. 7, 2011, the entire contents of which are incorporated herein by reference.

BACKGROUND

The invention concerns a laser nozzle usable for laser-beam cutting with the internal movable element comprising a skirt for concentrating the cutting gas in the cutting kerf, as well as a laser-cutting method using said nozzle, a laser focusing head on which said nozzle is fixed, and a laser cutting installation able to perform said method.

Laser-beam cutting requires the use of a nozzle, generally made from copper, the effect of which is to channel the gas and allow the laser beam to pass.

The nozzles typically have diameters of their outlet orifice of between 0.5 and 3 mm for a working distance of between 0.6 and 2 mm.

In order to enable cutting, it is necessary to use high pressures, generally of several bar, in the focusing head in order to enable the gas to enter the kerf so as to drive out the molten metal.

However, a large part of the gas used, typically between 50% and 90%, has no action on the cutting process, that is to say on the expulsion of the molten metal, since it starts on the sides of the cutting kerf.

These gas losses are in fact due to the enormous difference between the cross-section of flow of the nozzle orifice and the size of the focal spot. Thus, by way of indication, the cross-section of flow of a nozzle with an outlet orifice with a diameter of 1.5 mm is 25 times greater than the cross-section of the focal spot created by the laser beam passing through this nozzle.

However, if an insufficient proportion of gas is used, cutting defects then appear, in particular adherent burrs and/or traces of oxidation.

Attempting to remedy this by reducing the diameter of the nozzle orifice is not ideal since the risk is then taken of having the laser beam striking the inside of the nozzle and damaging it, which moreover also impairs the cutting quality and/or the performances.

There exist moreover a certain number of documents proposing various solutions for attempting to assist the entry of gas into the kerf, for example EP-A-1669159, JP-A-62006790 and JP-A-61037393.

However, none of these solutions is truly ideal since there is often a complex architecture to use, with a size greater than that of a conventional nozzle, and/or having limited efficacy.

Some solutions propose in particular to use a laser nozzle comprising a movable element, the end of which is pressed by a spring against the surface of the part to be cut in order to assist the injection of the cutting gas into the kerf.

The major drawback of these solutions lies in the fact that the force exerted by the spring in the direction of the metal sheet, added to the pressure of the cutting gas, leads the movable element to exert a high force on the sheet to be cut. The result is a risk of deformation, scratching or even driving of the metal sheet, which is in general simply placed on the table of the industrial cutting machine.

Furthermore, the movable element in contact with the metal sheet is liable to be damaged by burrs, splashing or obstacles forming reliefs on the surface of the sheet. This reduces the service life of the nozzle and impairs the productivity of the method.

To attempt to remedy this, the document JP-A-7251287 proposes a laser nozzle comprising a movable element and a spring exerting a force tending to press said element onto the sheet. Furthermore, JP-A-7251287 proposes using the force exerted by the cutting gas delivered in the nozzle and escaping under the surface of said element situated opposite the sheet to be cut in order to cause a slight distancing of the movable element with respect to the sheet.

However, this solution continues to pose certain problems.

SUMMARY

In particular, an industrial cutting method uses steps during which no cutting gas is delivered by the nozzle, or only a low pressure of cutting gas supplies the nozzle.

This is particularly the case during piercing of the metal sheet, which is performed with low gas pressures, typically less than 4 bar, or during rapid movements of the nozzle above the sheet, at a distance ranging typically from 0.5 mm to a few mm, which are performed without cutting gas or beam, in particular when several interleaving parts are cut on the same sheet. To gain in speed and production rate, these operations are generally performed by avoiding lifting the device that supports the nozzle with respect to its position in the cutting configuration.

In these situations, the solution of JP-A-7251287 does not permit sufficient distancing of the movable element with respect to the sheet and the problems mentioned above are again encountered. Furthermore, the movable element continuously projects outside the nozzle body. The result is an increased risk of damage. This also poses a problem in the piercing phases where an excessively close proximity of the nozzle with the sheet is to be proscribed because of significant splashings of molten metal generated.

The problem that is posed is consequently being able to improve the efficacy of the gas used in laser cutting by increasing the proportion of gas having an action on the expulsion of the molten metal and consequently reducing the overall quantity of gas used and the pressure gas necessary while limiting the proportion of gas lost.

Furthermore, the aim of the present invention is to overcome all or some of the drawbacks of the devices of the prior art, in particular limiting or even preventing any risk of scratching, deformation or driving of the cut sheet and damage to the laser nozzle, during the various phases of an industrial cutting method, in particular the phases not using gas or using low gas pressures.

The solution of the present invention is a laser nozzle comprising:
- a nozzle body comprising an axial nozzle axially passing through said nozzle body and comprising a first outlet orifice situated at the front face of the nozzle body,
- a movable element arranged in the axial housing of the nozzle body comprising a front part forming a skirt and an axial passage with a second outlet orifice emerging at the front part forming a skirt, said movable element being able to move in translation in the axial housing in the direction of the first outlet orifice under the effect of a gas pressure exerted on the movable element, and an elastic element arranged in the axial housing, between the nozzle body and the movable element, said elastic element exerting an elastic return force on the movable element tending to oppose the translation movement in the axial housing in the direction of the first outlet orifice, characterised in that the internal profile of said axial passage of the movable element comprises an upstream portion with a convergent frustoconical shape, a downstream portion with a divergent frustoconical shape and an intermediate portion with a cylindrical shape situated between the upstream portion with a convergent frustoconical shape and the downstream portion with a divergent frustoconical shape.

According to circumstances, the nozzle of the invention may comprise one or more of the following technical features:

- when the movable element moves in translation in the axial housing in the direction of the first outlet orifice situated at the front face of the nozzle body, the front part forming a skirt of the movable element projects outside the axial housing through the first outlet orifice of the front face of the nozzle body;
- the movable element is able to move in translation in the axial housing until the front part forming a skirt of the movable element projects outside the axial housing through the first outlet orifice of the front face of the nozzle body;
- the bottom of the axial housing of the nozzle body comprises a shoulder, and the peripheral wall of the movable element comprises a stop, the elastic element being positioned between the shoulder and the stop;
- at least one sealing element is arranged between the nozzle body and the movable element;
- said at least one sealing element is arranged in a peripheral groove 14 provided in the external peripheral wall of the movable element;
- the movable element is able to move between several positions comprising:
  - an idle position in which the skirt of the front part is totally or almost totally retracted in the axial housing of the nozzle body, and
  - a working position in which the skirt of the front part totally or almost totally projects outside the axial housing of the nozzle body, through the first outlet orifice;
- the nozzle body is made from an electrically conductive material, in particular copper, brass or the like;
- the movable element is formed wholly or partly from an electrically insulating material;
- alternatively, the movable element is made from an electrically conductive material that is resistant to temperature/heat, in particular copper, brass or the like, said insulating element comprising at least one insulating interface arranged between the nozzle and the wall of the movable insert. The insulating interface is either a sleeve arranged in the nozzle body, or an insulating cladding carried by the nozzle body or the movable element.

The invention also relates to a laser focusing head comprising at least one focusing lens, characterised in that it also comprises a laser nozzle according to one of the preceding claims.

Moreover, the invention also concerns a laser installation comprising a laser generator, a laser focusing head and a laser beam conveying device connected to said laser generator and to said laser focusing head, characterised in that the laser focusing head is in accordance with the invention.

Preferably, the laser generator is of the $CO_2$ or YAG type, with fibres or discs.

According to yet another aspect, the invention also relates to a method for the laser-beam cutting of a part to be cut, in which a nozzle according to the invention, a laser focusing head according to the invention or an installation according to the invention is used.

Preferably, when a gas flow passes through the axial passage of the movable element of the nozzle, the divergent frustoconical downstream portion of said movable element is able to produce a leakage of gas, preferably controlled, between the front part of said movable element and the top surface of the part to be cut in order to form a gaseous layer under the front part of said movable element, thus opposing the translation movement of the movable element and holding the front part of said movable element at a distance of between 0.01 and 0.1 mm from the top surface of the part to be cut.

BRIEF DESCRIPTION OF THE DRAWINGS

The invention will now be better understood by means of the following description given with reference to the accompanying figures, among which.

DESCRIPTION OF PREFERRED EMBODIMENTS

Figure 1A:
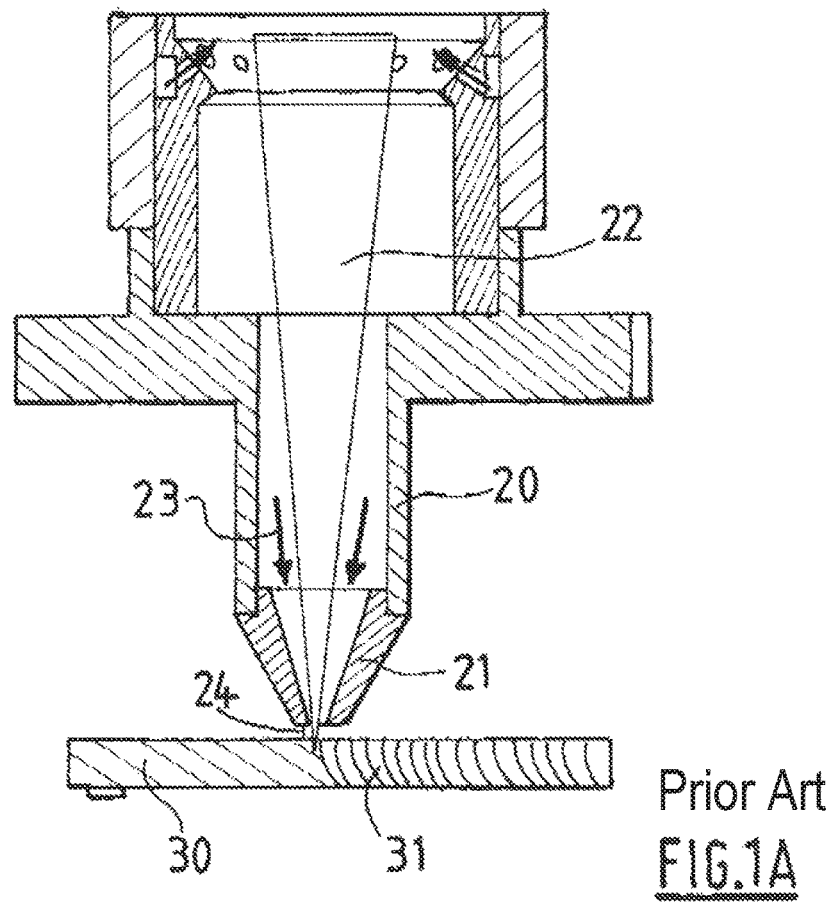
FIG. 1A shows diagrammatically a focusing head of a conventional laser cutting installation.

FIG. 1A shows the focusing head 20 of a conventional laser cutting installation, to which there is fixed a conventional laser nozzle 21 which has passing through it a focused laser beam and assistance gas (arrow 23) serving to expel the metal melted by the beam out of the cutting kerf 31 formed by the beam 22 in the metal part to be cut 30, for example a steel or stainless steel sheet.

The assistance gas may be an active gas, such as oxygen, air, $CO_2$ or hydrogen, or an inert gas such as argon, nitrogen or helium, or a mixture of several of these active and/or inert gases. The composition of the gas is chosen in particular according to the nature of the part to be cut.

The beam that impacts the part will melt thereon the metal that will be expelled below the part by the pressure of the assistance gas.

Figure 1B:
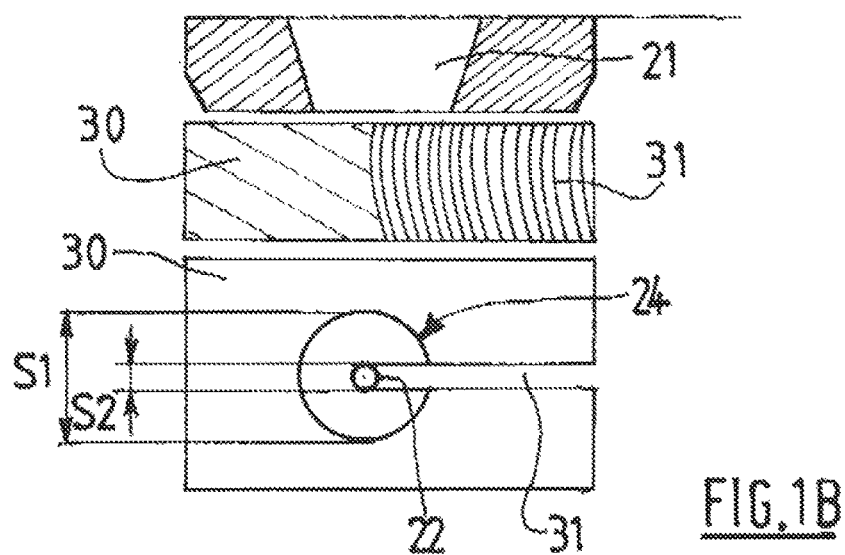
FIG. 1B shows schematically the size of the laser spot compared with the size of the nozzle orifice.

FIG. 1B shows clearly the cross-section of flow S1 of the orifice 24 of the nozzle 21 with respect to the size S2 of the focal spot of the beam 22. As can be seen, the cross-section S1 is very much greater than the size S2 of the focal spot of the beam 22, which, with conventional nozzles, gives rise to a high consumption of assistance gas, only a small proportion of which will serve to expel the molten metal out of the cutting kerf 31.

In order to considerably reduce the consumption of gas as well as the pressure necessary for cutting, the present invention proposes an improved laser nozzle able to and designed to cut with a laser beam using a reduced gas flow and/or gas pressure by virtue of a special nozzle architecture, making it possible to force a large proportion of gas to enter the kerf 31 and to effectively expel the molten metal therein, and this whatever the laser power and wavelength of the beam.

Figure 2:
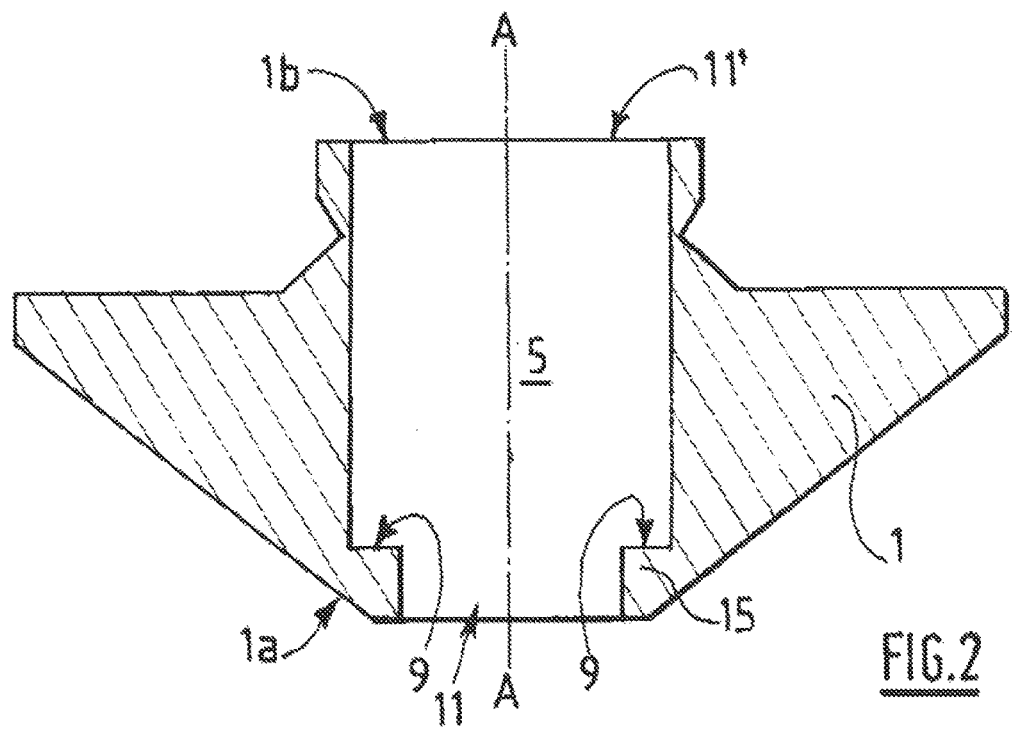
FIG. 2 is a diagram in cross-section of the body of a nozzle according to the invention.
Figure 3:
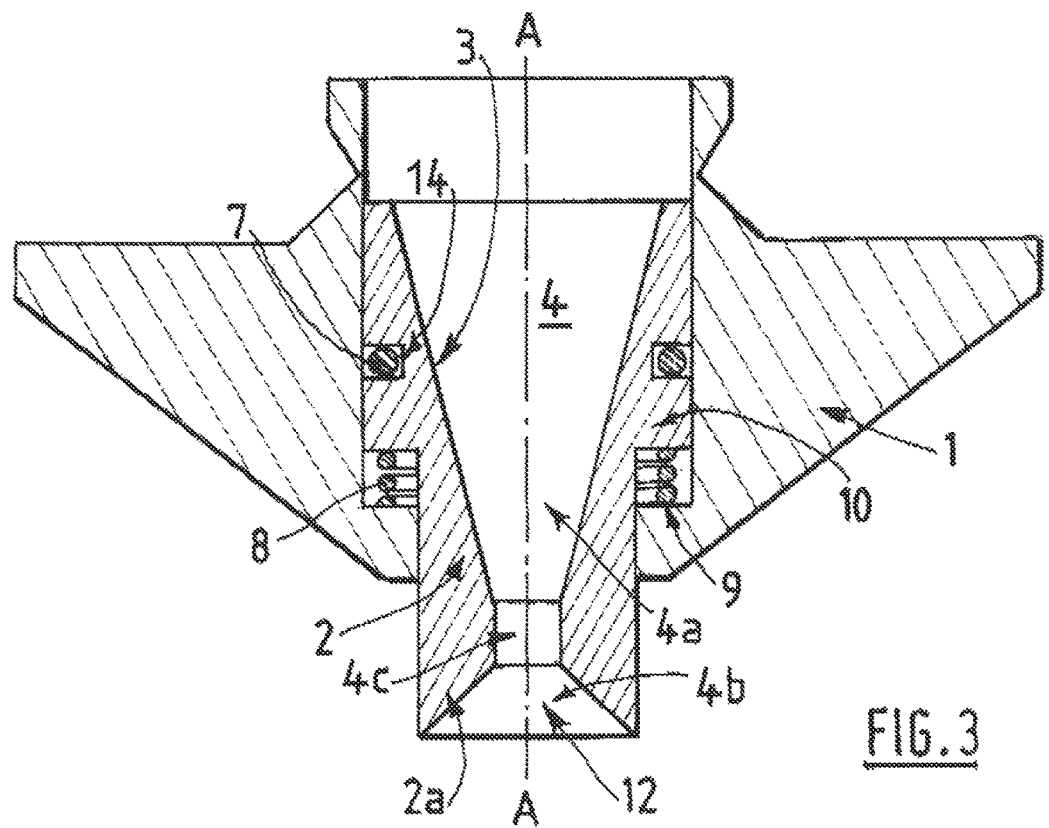
FIG. 3 is a diagram in cross-section of a nozzle according to the invention.

According to the invention, the laser nozzle comprises at least two essential components, namely a nozzle body 1 cooperating with a movable element 2 arranged so as to be able to move inside the body 1 of the nozzle, one embodiment of which is illustrated in FIG. 2 and FIG. 3.

More precisely, as can be seen in FIG. 2, the nozzle body 1 that is formed from a conductive material, for example copper or brass, is intended be fixed to the laser focusing head 20 of the laser installation.

Advantageously, the nozzle body 1 is a part of revolution that has passing right through it an axial housing 5 of axis AA that extends from the rear face 1b to the body 1 as far as the front face 1a of said body 1.

The axial housing 5 emerges at the two front 1a and rear 1b faces of the nozzle body 1. The rear face 1b therefore carries a first inlet orifice 11' whereas the front face 1a carries a first outlet orifice 11 of the nozzle body 1, the first inlet 11' and outlet 11 orifices being coaxial of axis AA.

This axial housing 5 is in fact a recess, for example cylindrical in shape, comprising an internal shoulder 9 projecting radially towards the centre of the housing 5, said internal shoulder 9 being formed by a restriction 15 of the cross-section of the axial housing 5 at the first outlet orifice 11 situated on the front face 1a of the nozzle body 1.

The nozzle of the invention moreover comprises a movable element 2 inserted in the housing 5 of the nozzle body 1, as can be seen in FIG. 3. This movable element 2 is able to and designed to move in translation along the axis AA inside the housing 5 of the nozzle body 1.

More precisely, this movable element 2 comprises a front part 2a forming a skirt 6, typically cylindrical in shape, that is to say tubular, arranged in the axial housing 5 of the nozzle body 1 and comprising an axial passage 4 with a second outlet orifice 12 emerging at the front part 2 forming said skirt 6.

During use of the nozzle, the laser beam 22 and the assistance gas 23 pass through the axial passage 4 of the movable element 2 and emerge through the second outlet orifice 12 emerging at the front part 2 forming said skirt 6.

The movable element 2 is preferentially formed from an insulating material, for example polyetheretherketone (PEEK), Vespel®, ceramic or Pyrex.

The internal profile of the axial passage 4 of the movable element 2 comprises, along the axis AA, an upstream portion 4a of convergent frustoconical form, i.e. the cross-section of which gradually reduces, followed by a downstream portion 4b of divergent frustoconical form, i.e. the cross-section of which increases gradually until it forms the outlet orifice 12 of the movable element 2.

Alternatively, the internal profile of the axial passage 4 of the movable element 2 also comprises an intermediate portion 4c with a cylindrical shape situated between the frustoconical upstream portion 4a and the frustoconical downstream portion 4b of the internal profile of the axial passage 4.

The movable element 2 is movable axially with respect to the body 1 of the nozzle along the axis AA. In fact, the movable element 2 moves under the effect of the pressure of the assistance gas 23 that is exerted on said movable element 2, which tends to push it in the direction of the part to be cut 30.

The translational movement along the axis AA of the movable element 2 will cause the skirt 6 to move closer to the top surface of the part 30 to be cut. More precisely, the divergent frustoconical shape of the downstream portion 4b of the internal profile of the movable element 2 is able to produce a controlled leakage of gas between the front part 2a of the movable element 2 and the top surface of the part 30 to be cut. This will assist the formation of a fine gas layer under the front part 2a, thus opposing the translation movement of the movable element 2 towards the part to be cut 30 and holding the front part 2a of the movable element 2 at a distance 32 of between 0.01 and 0.1 mm from the top surface of the part to be cut 30.

Thus the gas will be channeled by the skirt 6 and be concentrated at the laser spot and therefore the kerf, which will greatly improve its efficacy and the expulsion of the metal will take place better.

Moreover, the fine gas layer formed by virtue of the downstream portion 4b of the internal profile of the movable element 2 makes it possible to hold the front part 2a of the movable element 2 at a distance 32 and therefore to limit the contact of the insert with the metal sheet, thus preventing any risk of scratching of the cut sheet. Naturally, the downstream portion 4b of the internal profile of the movable element 2 is able to produce a controlled gas leakage that is sufficiently low to preserve the ability of the skirt 6 to concentrate the gas at the kerf.

According to the invention, an elastic element 8, such as a spring, is arranged in the axial housing 5, between the nozzle body 1 and the movable element 2 so as to exert an elastic return force on the movable element 2 in a direction tending to move it away from the part to be cut.

Figure 4B:
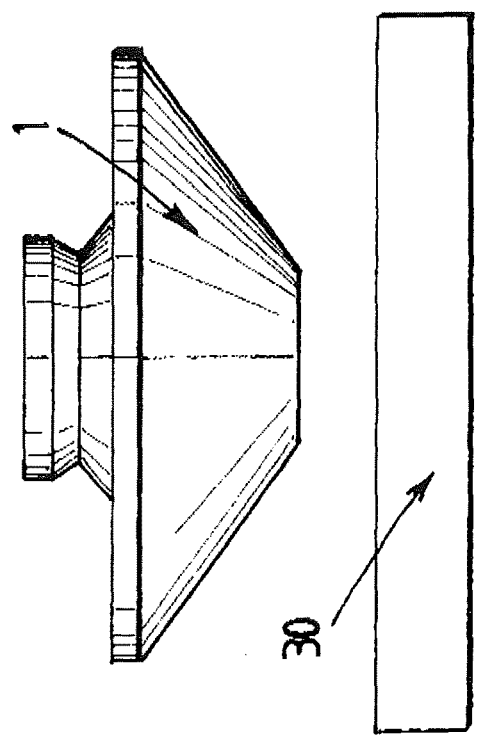
FIG. 4A and FIG. 4B show the nozzle of the invention with the movable element in two different positions.

Thus, at the end of cutting, when the gas is cut and the gas pressure ceases being exerted on the movable element 2, the latter can be returned to its idle position and therefore the skirt 6 can completely or almost completely retract inside the housing 5, as illustrated in FIG. 4B.

It is thus possible to effect rapid movements of the body of the nozzle above the metal sheet, typically at a few mm from the sheet, preventing the movable element projecting outside the housing 5, or greatly limiting the portion of skirt projecting outside the housing 5, and therefore without risking damaging the movable element 2, in particular the front part 2a.

The nozzle of the invention also makes it possible to perform piercing operations with a low gas pressure without the movable element 2 projecting outside the housing 5 or greatly limiting the portion of skirt 2a projecting outside the housing 5. The return force of the elastic element 8 is then advantageously sized so that a gas pressure ranging preferably up to 4 bar is not sufficient for the movable element 2 to move in translation towards the metal sheet. It is thus avoided damaging the inside of the movable element 2 and the front part 2a.

Finally, the present invention makes it possible for the movable element 2 to be able to be moved away from the metal sheet, without having to lift the focusing head supporting the nozzle of the invention, that is to say moving it away from the metal sheet.

It should be noted that the external peripheral wall of the movable element 2 comprises a stop 10, preferably an annular stop extending over all or part of the periphery of said movable element 2, the elastic element 8 being positioned between the shoulder 9 and the stop 10.

Figure 4A:
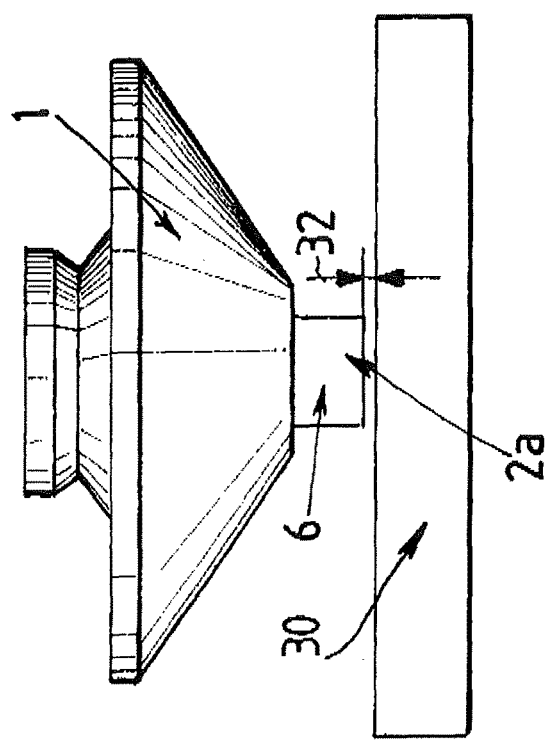

In fact, the movable element 2 of the nozzle according to the invention is therefore able to move between several positions comprising at least:

an idle position in which the skirt 6 of the front part 2*a* is completely or almost completely retracted in the axial housing 5 of the nozzle body 1, as illustrated in FIG. 4B, and a working position in which the skirt 6 of the front part 2*a* projects completely or almost completely outside the axial housing 5 of the nozzle body 1, through the first outlet orifice 11, and comes at a distance 32 from the top surface of the part 30 to be cut, as illustrated in FIG. 4A.

Naturally, the movable element 2 can occupy intermediate positions in which the skirt 6 only partially projects outside the axial housing 5 of the nozzle body 1. These intermediate positions may in particular depend on the pressure exerted by the gas on the movable element 2.

Moreover, at least one sealing element 7 is arranged between the nozzle body 1 and the movable element 2, in particular one or more O-ring seals 7, which provides a seal between the nozzle body 1 and the movable insert 2.

As can be seen in FIG. 3, the nozzle of the invention is of standard size, that is to say its size is not increased compared with a conventional nozzle body, which is advantageous and compatible for cuts by interleaving, that is to say parts within the same metal sheet with very little separation between the various parts.

In addition, the nozzle of the invention has the other advantage of being compatible with capacitive sensor systems. This is because the part made from copper or other conductive material adapts to the height specified by the capacitive sensor, like a standard nozzle. It is the movable insert 2 which, under the pressure of the gas, comes close to the sheet 30 to be cut and thus limits gas leakages.

The nozzle of the invention comprises a movable element 2 the outlet orifice diameter 12 of which is preferably between 0.5 and 5 mm.

EXAMPLES

In order to show the efficacy of the nozzle according to the invention compared with a standard nozzle, and therefore the advantage of forcing the gas into the cutting groove by virtue of the use of a skirt mounted on a movable element, comparative tests were carried out using a cutting installation with a laser generator of the $CO_2$ type for generating a laser beam that is brought to a laser focusing head comprising focusing optics, namely lenses.

The laser focusing head is equipped, according to circumstances, with a standard nozzle with an outlet orifice 1.8 mm in diameter or a nozzle according to FIG. 3 with a cylindrical movable skirt 1.8 mm in diameter.

The assistance gas used is nitrogen.

The cut part is a 304 L stainless steel sheet 5 mm thick.

The laser beam has a power of 4 kW and the cutting speed is 2.6 m/min.

The results obtained showed that:

with the standard nozzle, a gas pressure of 14 bar is insufficient to obtain a quality cut. This is because, at 14 bar, the cut edges comprise numerous adherent burrs. This demonstrates that the discharge of the molten metal is badly done because of an insufficient action of the gas on the molten metal that has to be expelled. In order to eliminate these burrs, a pressure of 16 bar was necessary;

with the nozzle of the invention, tests carried out at pressures ranging between 1 and 5 bar led to cuts of good quality, that is to say with cutting edges devoid of adherent burrs. The skirt of the nozzle makes it possible to channel the gas into the groove and to effectively expel the molten metal. The top surface of the cut sheet is free from scratches.

These tests demonstrate clearly the efficacy of a nozzle according to the invention, which makes it possible to considerably reduce the gas pressures to be used compared with a standard nozzle, all other conditions being equal, and therefore also to reduce gas consumptions.

It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

The invention claimed is:

1. A laser nozzle comprising:
    a nozzle body comprising a front face, and an axial housing axially passing through said nozzle body and comprising a first outlet orifice situated at the front face of the nozzle body,
    a movable element arranged in the axial housing of the nozzle body comprising a front part forming a skirt and an axial passage with a second outlet orifice emerging at the front part forming a skirt, said movable element being able to move in translation in the axial housing due to a gas pressure exerted on the movable element, wherein the axial passage comprises an internal profile, and
    an elastic element arranged in the axial housing, between the nozzle body and the movable element, said elastic element exerting an elastic return force on the movable element tending to oppose the translation movement in the axial housing in the direction of the first outlet orifice,
    wherein the internal profile of said axial passage of the movable element comprises an upstream portion with a convergent frustoconical shape, a downstream portion with a divergent frustoconical shape and an intermediate portion with a cylindrical shape situated between the upstream portion with a convergent frustoconical shape and the downstream portion with a divergent frustoconical shape.

2. The nozzle according to claim 1, wherein of the first outlet orifice situated at the front face of the nozzle body, the front part forming a skirt of the movable element projects outside the axial housing through the first outlet orifice of the front face of the nozzle body.

3. The nozzle according to claim 1, wherein the movable element is able to move in translation in the axial housing until the front part forming a skirt of the movable element projects outside the axial housing through the first outlet orifice of the front face of the nozzle body.

4. The nozzle according to claim 1, wherein at least one sealing element is arranged between the nozzle body and the movable element.

5. The nozzle according to claim 1, wherein the movable element is able to move between several positions comprising:
    an idle position in which the skirt of the front part is totally or almost totally retracted in the axial housing of the nozzle body, and
    a working position in which the skirt of the front part totally or almost totally projects outside the axial housing of the nozzle body, through the first outlet orifice.

6. A laser focusing head comprising at least one focusing lens, further comprising a laser nozzle according to claim 1.

7. A laser installation comprising a laser generator, a laser focusing head and a laser beam conveying device connected to said laser generator and to said laser focusing head, the laser focusing head is in accordance with claim 6.

8. The installation of claim 7, wherein the laser generator is of the $CO_2$ or YAG type, with fibres or discs.

* * * * *